(12) United States Patent
Tsai

(10) Patent No.: US 9,642,060 B2
(45) Date of Patent: May 2, 2017

(54) COMMUNICATION METHODS OF IP FLOW MOBILITY WITH RADIO ACCESS NETWORK LEVEL ENHANCEMENT

(71) Applicant: INDUSTRIAL TECHNOLOGY RESEARCH INSTITUTE, Hsinchu (TW)

(72) Inventor: Tzu-Jane Tsai, Zhubei (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 136 days.

(21) Appl. No.: 14/536,880

(22) Filed: Nov. 10, 2014

(65) Prior Publication Data

US 2015/0181504 A1     Jun. 25, 2015

Related U.S. Application Data

(60) Provisional application No. 61/918,689, filed on Dec. 20, 2013.

(51) Int. Cl.
*H04W 4/00* (2009.01)
*H04W 36/22* (2009.01)
(Continued)

(52) U.S. Cl.
CPC ........... *H04W 36/22* (2013.01); *H04W 28/08* (2013.01); *H04W 88/06* (2013.01)

(58) Field of Classification Search
USPC .......... 370/230–259, 328–345; 455/435–456
See application file for complete search history.

(56) References Cited

U.S. PATENT DOCUMENTS 8,867,486 B2 * 10/2014 Cherian ................. H04L 45/38
370/331
2010/0315948 A1 * 12/2010 Yi ........................... H04L 47/10
370/235
(Continued)

FOREIGN PATENT DOCUMENTS

CN     103181237 A     6/2013
CN     103379569 A     10/2013
(Continued)

OTHER PUBLICATIONS

3GPP TR 23.861, V1.7.0, "3rd Generation Partnership Project; Technical Specification Group Services and System Aspects; Network based IP flow mobility (Release 12)", Technical Report, (Nov. 2012).
(Continued)

*Primary Examiner* — Man Phan
(74) *Attorney, Agent, or Firm* — Birch, Stewart, Kolasch & Birch, LLP

(57) ABSTRACT

A communication method comprises the following steps: receiving an IFOM triggering message by a packet data network gateway (P-GW); selecting one or more evolved packet system (EPS) bearers by the P-GW based on the IFOM triggering message, and making a bearer division if IP flows associated with a user equipment (UE) are not allowed to a first access network; sending a first request to the first access network in response to the bearer division; updating a mapping table if the first request is acknowledged by the first access network; and initiating a third generation partnership project (3GPP) bearer update procedure to move the one or more EPS bearers selected by the P-GW to the first access network.

11 Claims, 13 Drawing Sheets

(51) Int. Cl.
*H04W 28/08* (2009.01)
*H04W 88/06* (2009.01)

(56) References Cited

U.S. PATENT DOCUMENTS

| | | |
|---|---|---|
| 2011/0310906 A1 | 12/2011 | Stenfelt et al. |
| 2012/0099461 A1* | 4/2012 | Yi ............... H04B 7/2606 370/252 |
| 2012/0188949 A1* | 7/2012 | Salkintzis ........ H04L 45/308 370/329 |
| 2012/0257598 A1 | 10/2012 | Karampatsis et al. |
| 2012/0324100 A1 | 12/2012 | Tomici et al. |
| 2013/0028172 A1 | 1/2013 | Lim et al. |
| 2013/0070596 A1* | 3/2013 | Yeh ............... H04W 36/0038 370/235 |
| 2013/0107863 A1* | 5/2013 | Faccin ........... H04W 36/0022 370/331 |
| 2013/0242965 A1 | 9/2013 | Horn et al. |
| 2013/0322300 A1* | 12/2013 | Landais ........... H04L 45/302 370/259 |
| 2014/0079022 A1* | 3/2014 | Wang ............. H04W 36/22 370/331 |
| 2014/0082697 A1 | 3/2014 | Watfa et al. |
| 2014/0086211 A1 | 3/2014 | Liu |
| 2014/0153546 A1 | 6/2014 | Kim et al. |
| 2014/0219248 A1* | 8/2014 | Reddiboyana ...... H04W 76/025 370/331 |
| 2016/0112239 A1* | 4/2016 | Kanugovi ........ H04L 29/06136 370/338 |
| 2016/0135222 A1* | 5/2016 | Jain ............... H04W 74/04 370/329 |

FOREIGN PATENT DOCUMENTS

| | | |
|---|---|---|
| TW | 201412159 A | 3/2014 |
| WO | WO 2011/157129 A2 | 12/2011 |
| WO | WO 2012/138091 A2 | 10/2012 |

OTHER PUBLICATIONS

3GPP TR 37.834 V12.0.0, "3rd Generation Partnership Project; Technical Specification Group Radio Access Network; Study on Wireless Local Area Network (WLAN)—3GPP radio interworking (Release 12)", Technical Report, (Dec. 2013).

Antonio de la Oliva et al., "IP Flow Mobility: Smart Traffic Offload for Future Wireless Networks", Traffic Management for Mobile Broadband Networks, IEEE Communications Magazine, pp. 124-132, Oct. 2011.

Najah Abu Ali et al., "Quality of Service in 3GPP R12 LTE-Advanced", Telecommunications Standards, IEEE Communications Magazine, pp. 103-109, Aug. 2013.

Perminder Dhawan et al., "Macro and Small Cell/Wi-Fi Networks: An Analysis of Deployment Options as the Solution for the Mobile Data Explosion", Alcatel-Lucent, Bell Labs Technical Journal, vol. 18, No. 1, pp. 59-79, 2013.

Xavier Costa-Pérez et al., "Latest Trends in Telecommunication Standards", ACM SIGCOMM Computer Communication Review, vol. 43, No. 2, pp. 64-71, Apr. 2013.

Young Min Kwon et al., "ANDSF-based Congestion Control Procedure in Heterogeneous Networks", IEEE, ICOIN, pp. 547-550, 2013.

\* cited by examiner

602

| IE/Group Name | Presence |
|---|---|
| Message Type | M |
| E-RAB to be steered | |
| MME UE S1AP ID | M |
| eNB UE S1AP ID | M |
| Target RAT Type | M |
| E-RAB Steered List | M |
| routing filter descriptions | O |

702

| IE/Group Name | Presence |
|---|---|
| Message Type | M |
| MME UE S1AP ID | M |
| eNB UE S1AP ID | M |
| E-RAB Released List | M |
| Steering Flag | M |
| Target RAT Type | M |
| routing filter descriptions | O |

802

| IE/Group Name | Presence |
|---|---|
| Message Type | M |
| eNB UE S1AP ID | M |
| Steering Flag | M |
| Target RAT Type | M |
| E-RAB To Be Switched in Downlink List | |
| E-RAB Switched in Downlink Item IEs | |
| E-RAB ID | M |
| Transport Layer address | M |
| GTP-TEID | M |
| routing filter descriptions | O |
| Source MME UE S1AP ID | M |

| TMSI | Routing Rule Name | Routing Access Type | BID | EPS Bearer ID | FID | Routing Filter |
|---|---|---|---|---|---|---|
| UE1 | Rule Name 1 | 3GPP | BID1 | 5 | FID1 | Description of IP flow 5-1 |
| | Rule Name 2 | 3GPP | BID1 | 6 | FID2 | Description of IP flow 6-2 (only in 3GPP indicated by ANDSF) |
| | Rule Name 3 | | | | FID3 | Description of IP flow 6-3 |
| | Rule Name 4 | | | | FID4 | Description of IP flow 6-4 |
| | Rule Name 5 | WLAN | BID2 | 7 | FID5 | Description of IP flow 7-5 |
| UE2 | Rule Name 6 | 3GPP | BID3 | 5 | FID6 | Description of IP flow 5-6 |
| --- | --- | --- | --- | --- | --- | --- |

| Routing Rule Name | Routing Access Type | EPS Bearer ID | Routing Filter |
|---|---|---|---|
| Rule Name 1 | 3GPP | 5 | Description of IP flow 5-1 |
| Rule Name 2 | 3GPP | 6 | Description of IP flow 6-2 (only in 3GPP indicated by ANDSF) |
| Rule Name 3 | | | Description of IP flow 6-3 |
| Rule Name 4 | | | Description of IP flow 6-4 |
| Rule Name 5 | WLAN | 7 | Description of IP flow 7-5 |

| C-RNTI/ eNB UE S1AP ID | Routing Access Type | EPS Bearer ID | RAB ID |
|---|---|---|---|
| UE1 | 3GPP | 5 | 0 |
| | 3GPP | 6 | 2 |
| | WLAN | 7 | 1 |
| UE2 | 3GPP | 5 | 0 |
| --- | --- | --- | --- |

| TMSI | Routing Rule Name | Routing Access Type | BID | EPS Bearer ID | FID | Routing Filter |
|---|---|---|---|---|---|---|
| UE1 | Rule Name 1 | 3GPP | BID1 | 5 | FID1 | Description of IP flow 5-1 |
| | Rule Name 2 | 3GPP | | 6 | FID2 | Description of IP flow 6-2 (only in 3GPP indicated by ANDSF) |
| | Rule Name 3 | WLAN | BID2 | 8 | FID3 | Description of IP flow 8-3 |
| | Rule Name 4 | WLAN | | | FID4 | Description of IP flow 8-4 |
| | Rule Name 5 | WLAN | | 7 | FID5 | Description of IP flow 7-5 |
| UE2 | Rule Name 6 | 3GPP | BID3 | 5 | FID6 | Description of IP flow 5-6 |
| --- | --- | --- | --- | --- | --- | --- |

| Routing Rule Name | Routing Access Type | EPS Bearer ID | Routing Filter |
|---|---|---|---|
| Rule Name 1 | 3GPP | 5 | Description of IP flow 5-1 |
| Rule Name 2 | 3GPP | 6 | Description of IP flow 6-2 (only in 3GPP indicated by ANDSF) |
| Rule Name 3 | WLAN | 8 | Description of IP flow 8-3 |
| Rule Name 4 | WLAN | 8 | Description of IP flow 8-4 |
| Rule Name 5 | WLAN | 7 | Description of IP flow 7-5 |

| C-RNTI/ eNB UE S1AP ID | Routing Access Type | EPS Bearer ID | RAB ID |
|---|---|---|---|
| UE1 | 3GPP | 5 | 0 |
| | 3GPP | 6 | 1 |
| | WLAN | 8 | 3 |
| | WLAN | 7 | 2 |
| UE2 | 3GPP | 5 | 0 |
| --- | --- | --- | --- |

FIG. 11(c)

COMMUNICATION METHODS OF IP FLOW MOBILITY WITH RADIO ACCESS NETWORK LEVEL ENHANCEMENT

This application claims the benefit of U.S. provisional application Ser. No. 61/918,689, filed Dec. 20, 2013, the disclosure of which is incorporated by reference herein in its entirety.

TECHNICAL FIELD

The disclosure relates in general to communication methods of IP flow mobility (IFOM) with radio access network (RAN) level enhancement.

BACKGROUND

With the development of wireless communication technology, various applications of wireless networks lead to an explosive growth of wireless data services. Although the data capacity of third generation partnership project (3GPP) networks has increased significantly, user traffic continues to growth in capacity, resulting in increased network congestion and degraded user service.

Therefore, there is a need for providing a communication technology capable of enhancing the radio capacity.

SUMMARY

The disclosure is directed to communication methods of IP flow mobility (IFOM) with radio access network (RAN) level enhancement.

According to one embodiment, a communication method of IFOM is provided. The communication method comprises the following steps: receiving an IFOM triggering message by a packet data network gateway (P-GW); selecting one or more evolved packet system (EPS) bearers by the P-GW based on the IFOM triggering message, and making a bearer division if IP flows associated with a user equipment (UE) are not allowed to a first access network; sending a first request to the first access network in response to the bearer division; updating a mapping table if the first request is acknowledged by the first access network; and initiating a third generation partnership project (3GPP) bearer update procedure to move the one or more EPS bearers selected by the P-GW to the first access network.

According to another embodiment, a communication method of IFOM is provided. The communication method comprises the following steps: receiving a traffic steering response from a UE by an eNB; transmitting an IFOM triggering message by the eNB, wherein triggering a 3GPP dedicated bearer activation, modification, or deactivation by a P-GW in response to the IFOM triggering message; and updating a traffic steering mapping table of the eNB in response to the 3GPP dedicated bearer activation, modification, or deactivation triggered by the P-GW.

According to still another embodiment, a communication method of IFOM is provided. The communication method comprises the following steps: connecting simultaneously to the a 3GPP access network and a non-3GPP access network by a UE, and transmitting IP flows via the 3GPP access network and the non-3GPP access network; transmitting an IFOM triggering message by the UE, wherein making a bearer division by a P-GW in response to the IFOM triggering message; and updating a mapping table stored at the UE in response to the bearer division made by the P-GW.

BRIEF DESCRIPTION OF THE DRAWINGS

FIG. 8 shows another example of an IFOM triggering message that is realized by existing element procedures and adding new IEs.

FIG. 10(a) shows a mapping table stored at the P-GW before updated by the eNB-initiated IFOM procedure shown in FIG. 9(b).

FIG. 10(b) shows a mapping table stored at the UE before updated by the eNB-initiated IFOM procedure shown in FIG. 9(b).

FIG. 10(c) shows a mapping table stored at the eNB before updated by the eNB-initiated IFOM procedure shown in FIG. 9(b).

FIG. 11(a) shows a mapping table stored at the P-GW after updated by the eNB-initiated IFOM procedure shown in FIG. 9(b).

FIG. 11(b) shows a mapping table stored at the UE after updated by the eNB-initiated IFOM procedure shown in FIG. 9(b).

FIG. 11(c) shows a mapping table stored at the eNB after updated by the eNB-initiated IFOM procedure shown in FIG. 9(b).

Figure 1:
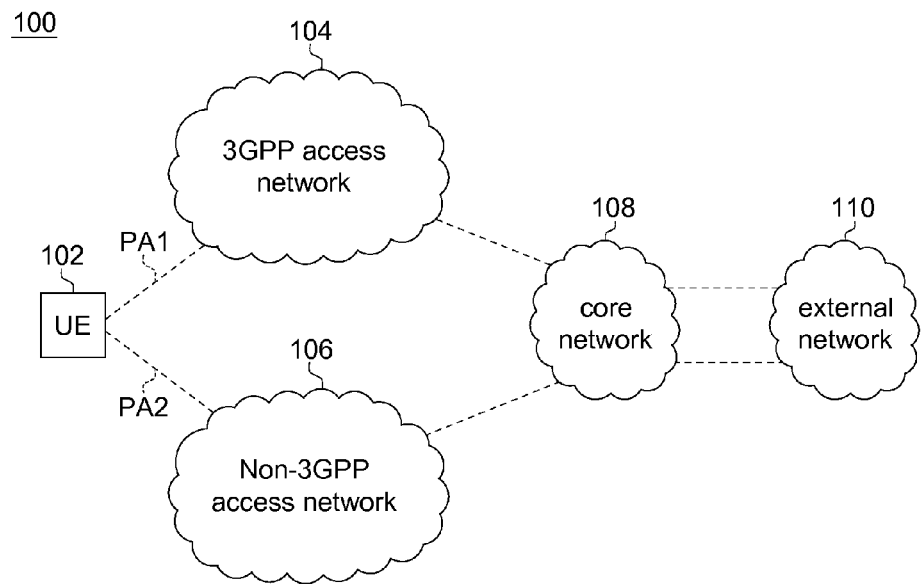
FIG. 1 shows a schematic diagram of a communication system according to an embodiment of the disclosure.

In the following detailed description, for purposes of explanation, numerous specific details are set forth in order to provide a thorough understanding of the disclosed exemplary embodiments. It will be apparent, however, that one or more embodiments may be practiced without these specific details. In other instances, well-known structures and devices are schematically shown in order to simplify the drawing.

DETAILED DESCRIPTION

Below, exemplary embodiments will be described in detail with reference to accompanying drawings so as to be clearly realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 shows a schematic diagram of a communication system 100 according to an embodiment of the disclosure. The communication system 100 comprises a user equipment (UE) 102, a 3GPP access network 104, a non-3GPP access network 106, a core network 108. The UE 102 is connected simultaneously to the 3GPP access network 104 and the non-3GPP access network 106, and may access to an external network 110 via the different radio access networks. In the embodiment, when the UE 102 executes various applications, multiple IP flows may be routed through the radios accesses via different data paths (e.g., path PA1 and/or path PA2). In addition, with an IP flow mobility (IFOM) procedure, the IP flows can be moved from the 3GPP accesses network 104 to the non-3GPP access network 106, or can be moved from the non-3GPP accesses network 106 to the 3GPP access network 104, depending on the network condition.

In the example of FIG. 1, the 3GPP access network 104 may be an Evolved Universal Terrestrial Radio Access Network (EUTRAN), the non-3GPP access network 106 may be a Wireless Local Area Network (WLAN), and the core network 108 may be an evolved packet core (EPC) network that supports various EPC interfaces for supporting the non-3GPP access network 106.

Figure 2A:
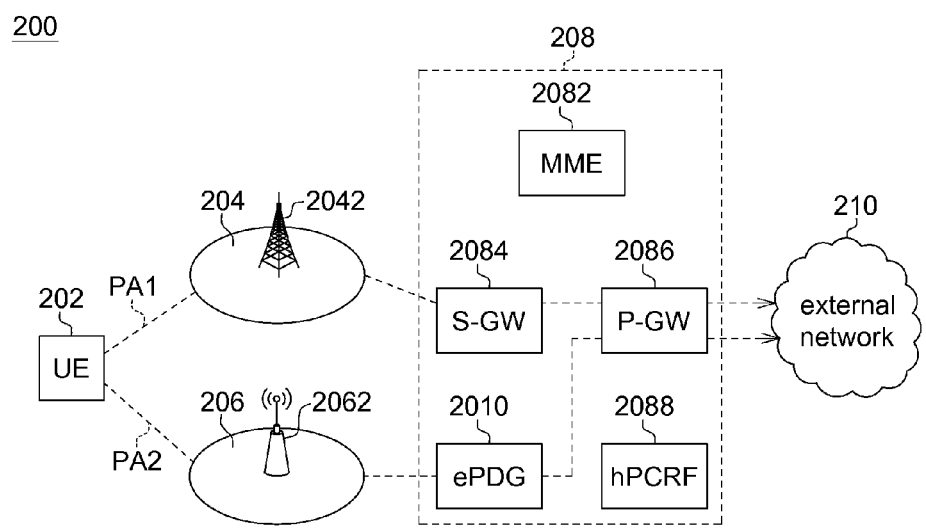
FIG. 2(a) shows a schematic diagram of network architecture of a communication system according to an embodiment of the disclosure.

FIG. 2(a) shows a schematic diagram of network architecture of a communication system 200 according to an embodiment of the disclosure. The communication system 200 comprises a UE 202, an EUTRAN 204, a WLAN 206 and an EPC network 208. The UE 202 is connected simultaneously to the EUTRAN 204 and the WLAN 206, and may access to an external network 210 via the different data paths PA1 and PA2. The EUTRAN 204 comprises at least one evolved NodeB (eNB) 2042. The WLAN 206 comprises at least one WLAN access point (AP) 2062. The UE 202, the EUTRAN 204 together with the WLAN 206 can be regarded as a radio access network (RAN).

The core network 208 comprises a mobility management entity (MME) 2082, a serving gateway (S-GW) 2084 a packet data network gateway (P-GW) 2086, a policy and charging rules function (hPCRF) 2088 and an enhanced packet data gateway (ePDG) 2010. In the embodiment, the P-GW 2086 may receive an IFOM triggering message. The P-GW 2086 may select one or more evolved packet system (EPS) bearers based on the IFOM triggering message and make a bearer division if IP flows associated with the UE 202 are not allowed to a first access network (e.g., the WLAN 206). Next, the P-GW 2086 may send a first request to the first access network in response to the bearer division. If the first request is acknowledged by the first access network, the P-GW 2086 may update a mapping table and initiate a 3GPP bearer update procedure to move the one or more EPS bearers selected by the P-GW 2086 to the first access network.

For an eNB-initiated procedure, the eNB 2042 may receive a traffic steering response from the UE 202. The eNB 2042 may transmit the IFOM triggering message, and the P-GW 2086 may trigger a 3GPP dedicated bearer activation, modification, or deactivation in response to the IFOM triggering message. Next, the eNB 2042 may update its traffic steering mapping table in response to the 3GPP dedicated bearer activation, modification, or deactivation triggered by the P-GW 2086.

For a UE-initiated procedure, the UE 202 may connect simultaneously to the 3GPP access network (e.g., the EUTRAN 204) and the non-3GPP access network (e.g., the WLAN 206) at first. The UE 202 may transmit IP flows via the 3GPP access network and the non-3GPP access network. Next, the UE 202 may transmit the IFOM triggering message, and the P-GW 2086 may make a bearer division in response to the IFOM triggering message. After that, the UE 202 may update a mapping table stored therein in response to the bearer division made by the P-GW 2086.

Figure 2B:
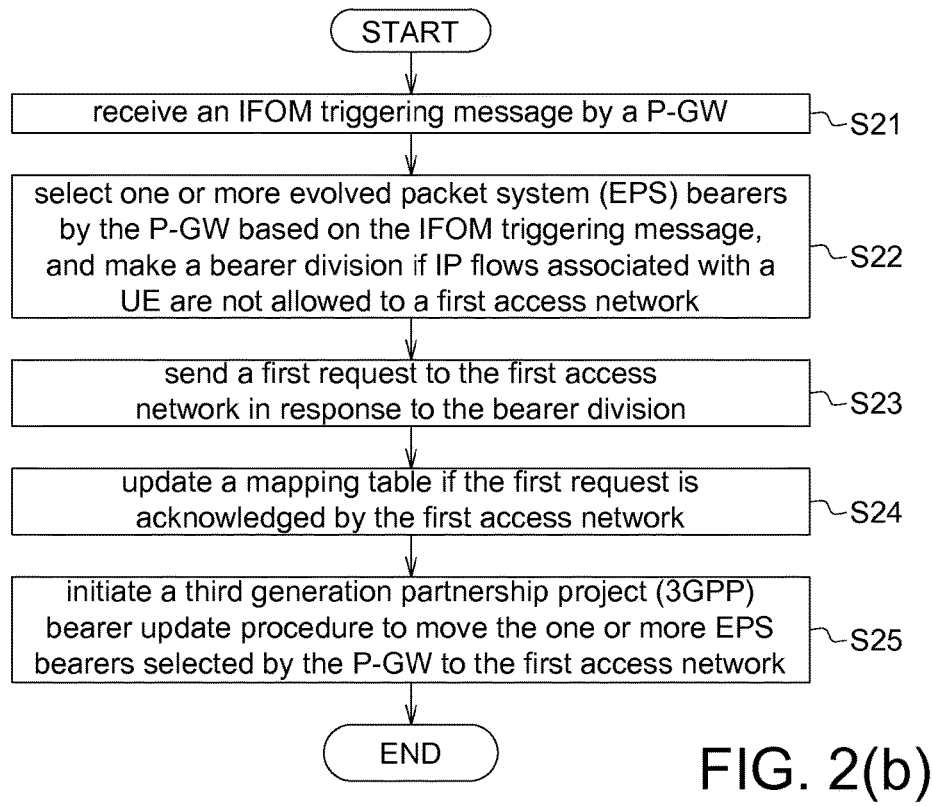
FIG. 2(b) shows a flow chart of a communication method according to an embodiment of the disclosure.

FIG. 2(b) shows a flow chart of a communication method according to an embodiment of the disclosure. At step S21, the P-GW 2086 receives an IFOM triggering message. At step S22, the P-GW 2086 selects one or more evolved packet system (EPS) bearers based on the IFOM triggering message, and makes a bearer division if IP flows associated with a UE are not allowed to a first access network. At step S23, the P-GW 2086 sends a first request to the first access network in response to the bearer division. At step S24, the P-GW 2086 updates a mapping table if the first request is acknowledged by the first access network. At step S25, the P-GW 2086 initiates a third generation partnership project (3GPP) bearer update procedure to move the one or more EPS bearers selected by the P-GW 2086 to the first access network.

Figure 2C:
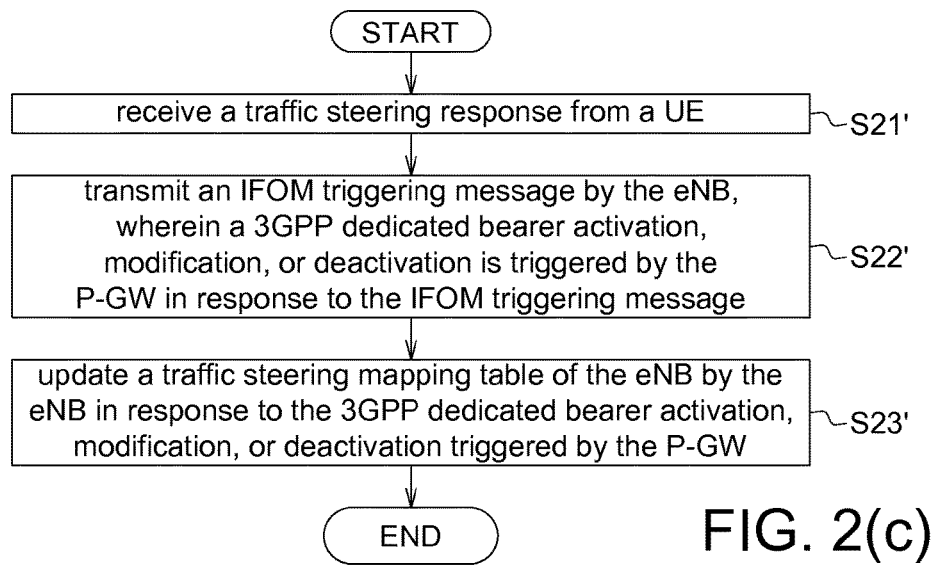
FIG. 2(c) shows a flow chart of a communication method according to an embodiment of the disclosure.

FIG. 2(c) shows a flow chart of a communication method according to an embodiment of the disclosure. At step S21', the eNB 2042 receives a traffic steering response from a UE. At step S22', the eNB 2042 transmits an IFOM triggering message, wherein triggering a 3GPP dedicated bearer activation, modification, or deactivation by the P-GW 2086 in response to the IFOM triggering message. At step S23', the eNB 2042 updates a traffic steering mapping table of the eNB 2042 in response to the 3GPP dedicated bearer activation, modification, or deactivation triggered by the P-GW 2086.

Detailed descriptions of the communication method of the embodiments of the present disclosure are described as follows.

Figure 3:
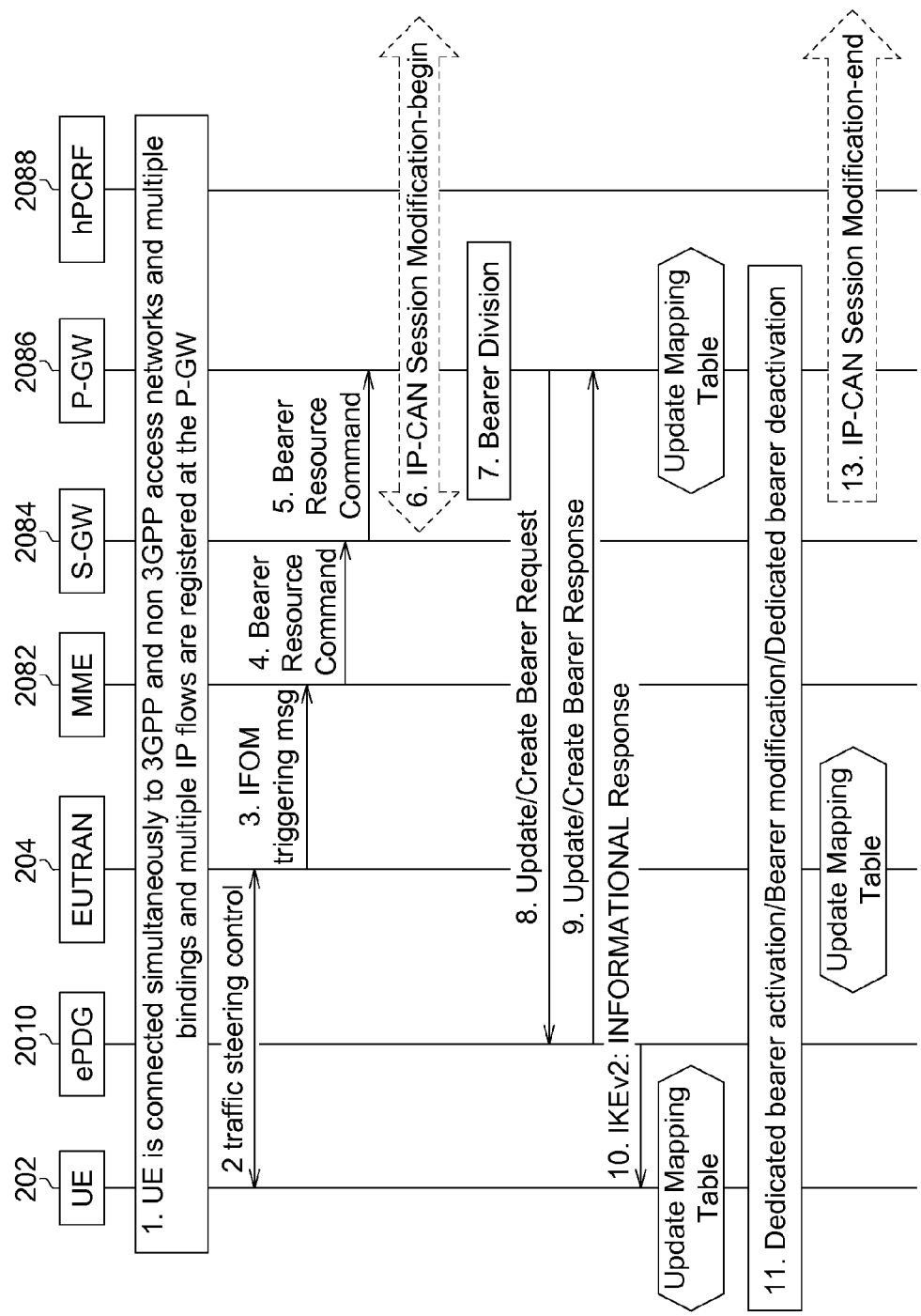
FIG. 3 shows a high-level message flow of an eNB-initiated IFOM procedure triggered from the EUTRAN.

FIG. 3 shows a high-level message flow of an eNB-initiated IFOM procedure triggered from the EUTRAN 204 (3GPP access network). In the example of FIG. 3, the IFOM triggering message is sent from the eNB 2042. At step 1, the UE 202 is connected simultaneously to the EUTRAN 204 (3GPP access network) and the WLAN 206 (non-3GPP access network), and multiple bindings and multiple IP flows are registered at the P-GW 2086. Step 2 is a bi-directional procedure for the traffic steering control between the UE 202 and the eNB 2042. About step 2, there are many solutions to realize, and the following are two examples. The first one is that the eNB 2042 may collect related measurement information from the UEs in its serving area, and sending traffic steering command to the UE 202. The second one is that the eNB 2042 may send traffic steering rules to the UE 202, and the UE 202 makes an offloading decision and informs its serving eNB 2042.

At step 3, the eNB 2042 sends an IFOM triggering message to the MME 2082 via S1 Application Protocol (S1AP). In the embodiment, the IFOM triggering message includes the information of multiple UEs with the corresponding multiple EPS bearers.

Steps 4 to 6 may follow the procedure defined in TR 23.861, Network based IP Flow Mobility. At step 4, the MME 2082 sends a Bearer Resource Command message which contains the IFOM triggering message to the S-GW 2084. At step 5, the S-GW 2084 sends the same Bearer Resource Command message to the P-GW 2086. At step 6, the P-GW 2086 performs an IP-Connectivity Access Network (IP-CAN) session modification procedure with the hPCRF 2088.

At step 7, the P-GW 2086 would make a bearer division if the Access Network Discovery and Selection Function (ANDSF)/hPCRF 2088 have forbidden or restrict some traffic indicated to offload by the RAN. After step 8 and 9, the P-GW 2086 updates its mapping table and after step 10, the UE 202 updates its mapping table. During step 11, a 3GPP dedicated bearer activation, modification, or deactivation is triggered by the P-GW 2086, and the eNB 2042 updates a traffic steering mapping table in response to the 3GPP dedicated bearer activation, modification, or deactivation.

Figure 4:
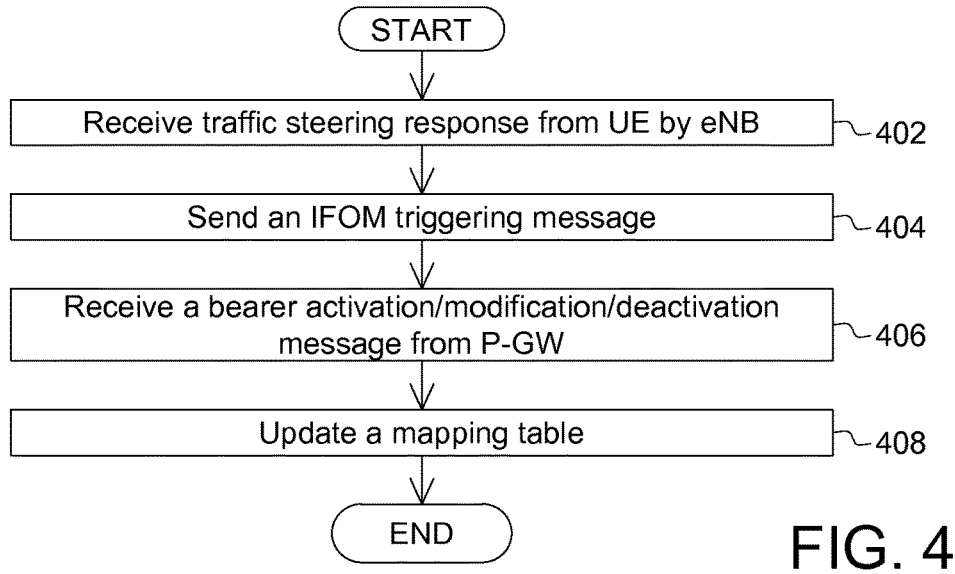
FIG. 4 shows a flow chart of an eNB-initiated IFOM procedure based on the eNB according to an embodiment of the present disclosure.

FIG. 4 shows a flow chart of an eNB-initiated IFOM procedure based on the eNB 2042 according to an embodiment of the present disclosure. At step 402, the eNB 2042 receives traffic steering response from the UE 202. At step 404, the eNB 2042 sends an IFOM triggering message. The IFOM triggering message comprises MME UE S1AP ID, eNB UE S1AP ID, Target RAT Type, List of evolved packet system (EPS) bearer ID and routing filter descriptions (if ANDSF supports) to the MME 2082. At step 406, the eNB 2042 is supposed to receive a bearer activation, modification or deactivation message from the P-GW 2086, and updates its traffic steering mapping table at step 408.

Figure 5:
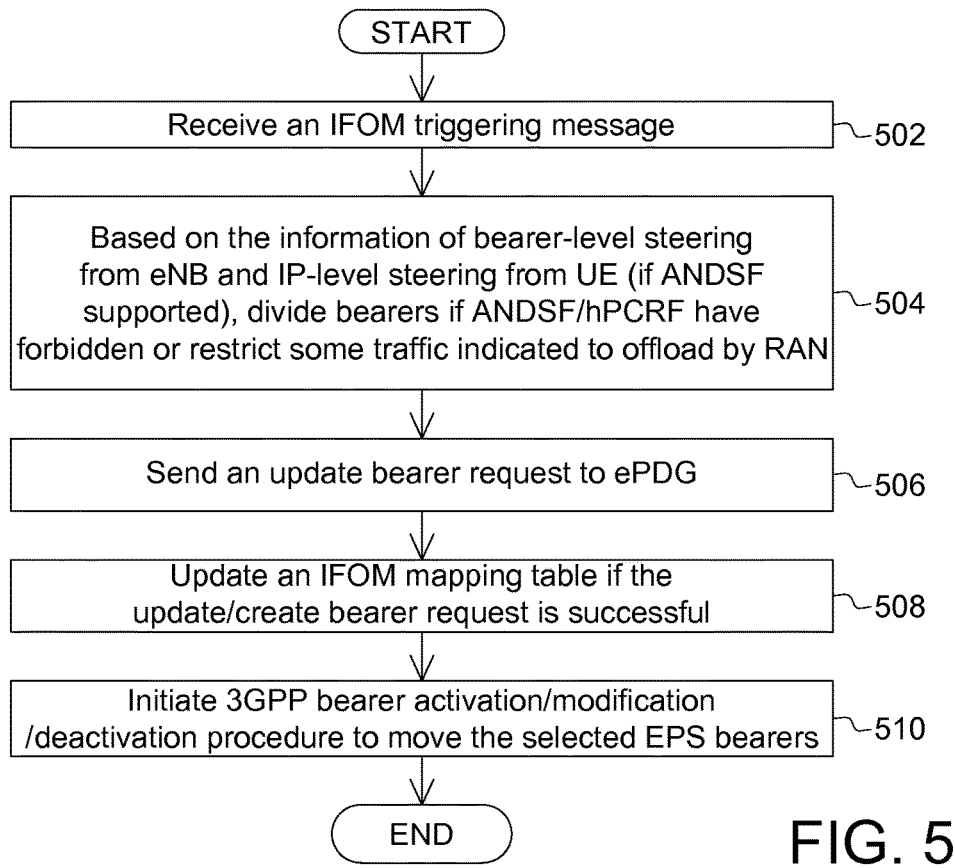
FIG. 5 shows a flow chart of an eNB-initiated IFOM based on the P-GW according to an embodiment of the present disclosure.

FIG. 5 shows a flow chart of an eNB-initiated IFOM based on the P-GW 2086 according to an embodiment of the present disclosure. At step 502, the P-GW 2086 receives an IFOM triggering message which is initiated by the eNB 2042. At step 504, based on the information of bearer-level steering from the eNB 2042 and IP-level steering from the UE 202 (if ANDSF is supported), the P-GW 2086 divides bearers if ANDSF/hPCRF 2088 have forbidden or restrict some traffic indicated to offload by the RAN. For example, the P-GW 2086 may check the information of bearer-level steering from the eNB 2042 and IP-level steering from the UE 202 (if ANDSF is supported), negotiates with the hPCRF 2088, and executes a bearer division if ANDSF/hPCRF 2088 have forbidden or restrict some traffic indicated to offload by the RAN. At step 506, the P-GW 2086 sends an update/create bearer request to the ePDG 2010 if the update/create bearer request is successful. At step 508, if a successful response is received from the ePDG 2010, the P-GW 2086 would update its IFOM mapping table, and initiate the 3GPP bearer activation, modification or deactivation procedure to move the selected EPS bearers at step 510.

Figures 6, 7:
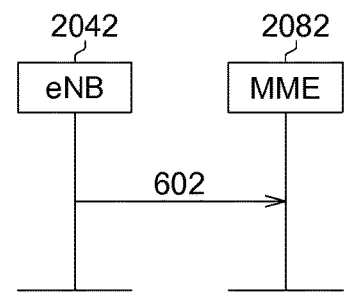
FIG. 6 shows an example of the message contents of an IFOM triggering message according to an embodiment of the present disclosure.
FIG. 7 shows an example of an IFOM triggering message that is realized by existing element procedures and adding new IEs.

FIG. 6 shows an example of the message contents of an IFOM triggering message 602 according to an embodiment of the present disclosure. In the example of FIG. 6, the IFOM triggering message 602 is an EUTRAN radio access bearer (E-RAB) Steering Request message designed for a newly defined element procedure between the eNB 2042 and the MME 2082. The IFOM triggering message 602 mainly comprises the following information elements (IEs): Message Type, and E-RAB to be steered further comprising MME UE S1AP ID, eNB UE S1AP ID, Target Radio Access Technology (RAT) Type, E-RAB Steered List, and routing filter descriptions which is optional.

For each IE, Message Type indicates the type of the IFOM triggering message 602, i.e., the EUTRAN E-RAB Steering Request message, MME UE S1AP ID indicates the UE association over the S1 interface within the MME, eNB UE S1AP ID indicates the UE association over the S1 interface within the eNB, Target RAT Type indicates the type of the access network to which the UE wants to move the IP flows, E-RAB Steered List indicates E-RABs for the UE, and routing filter descriptions is provided by the UE to identify a specific IP flow. Each IE has its corresponding presence condition. For example, the presence conditions of Message Type, MME UE S1AP ID, eNB UE S1AP ID, Target RAT Type, E-RAB Steered List are mandatory (M), and the presence condition of routing filter descriptions is Optional (O), but the present disclosure is not limited thereto.

In the embodiment, the eNB 2042 may send the IFOM triggering message 602 to its MME 2082 to initiates an IFOM procedure when one or more specific network conditions are satisfied. For example, if the network condition after the traffic steering control in step 2 of FIG. 3 satisfies a specific value, the eNB 2042 may send the IFOM triggering message 602 to its MME 2082 to initiates an IFOM procedure.

The IFOM triggering message 602 can be passed to the P-GW 2086 through the steps 3 to 5 shown in FIG. 3. After receiving the IFOM triggering message 602, the P-GW 1082 may select EPS bearers based on the IFOM triggering message 602, and make a bearer division if at least one of IP flows is not allowed to an access network.

In other embodiments of the present disclosure, the eNB-initiated IFOM procedure can be realized by existing element procedures and adding new IEs.

FIG. 7 shows an example of an IFOM triggering message 702 that is realized by existing element procedures and adding new IEs. Unlike the IFOM triggering message 602 shown in FIG. 6, in this example, new IEs are added to an existing E-RAB Release Indication message to form the IFOM triggering message 702. The new IEs comprise Steering Flag, Target RAT Type, E-RAB Released List and routing filter descriptions (optional). Steering Flag indicates the E-RAB Release Indication is used for an IFOM procedure rather than a release procedure. Target RAT Type indicates the type of the access network to which the UE wants to move the specific IP flows. E-RAB Released List indicates E-RABs to be steered for the UE, and routing filter descriptions is provided by the UE to identify specific IP flows.

FIG. 8 shows another example of an IFOM triggering message 802 that is realized by existing element procedures and adding new IEs. Unlike the IFOM triggering message 602 shown in FIG. 6, in this example, new IEs are added to an existing Path Switch Request message to form the IFOM triggering message 802. The new IEs comprise Steering Flag, Target RAT Type, E-RAB To Be Switched in Downlink List and routing filter descriptions (optional). Steering Flag indicates the modified Path Switch Request is for an IFOM procedure rather than a switching downlink traffic procedure. Target RAT Type indicates the type of the access network to which the UE wants to move the specific IP flows. E-RAB To Be Switched in Downlink List indicates E-RABs to be steered for the UE, and routing filter descriptions is provided by the UE to identify specific IP flows.

Figure 9A:
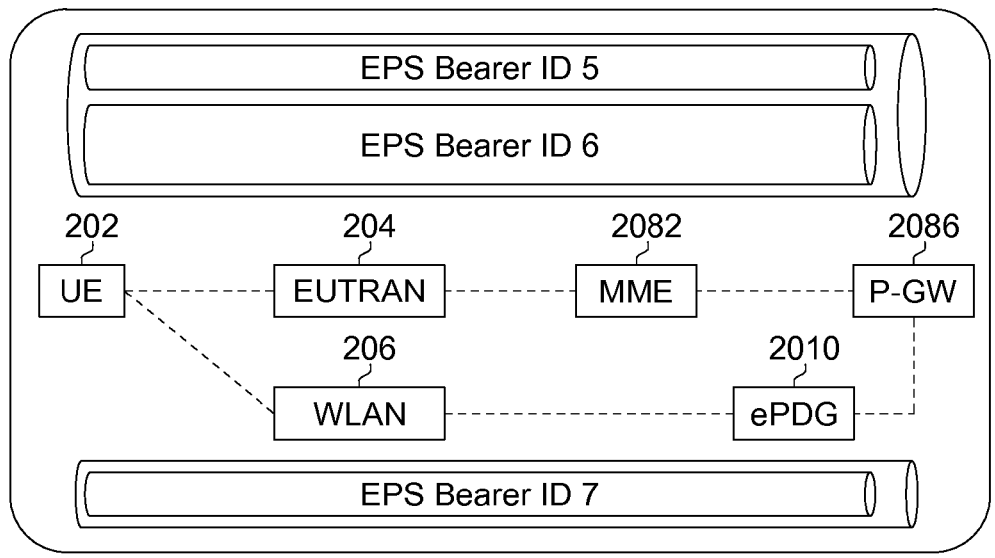
FIG. 9(a) shows a schematic diagram of the communication system from the perspective of user plane according to an embodiment of the present disclosure.
Figure 9B:
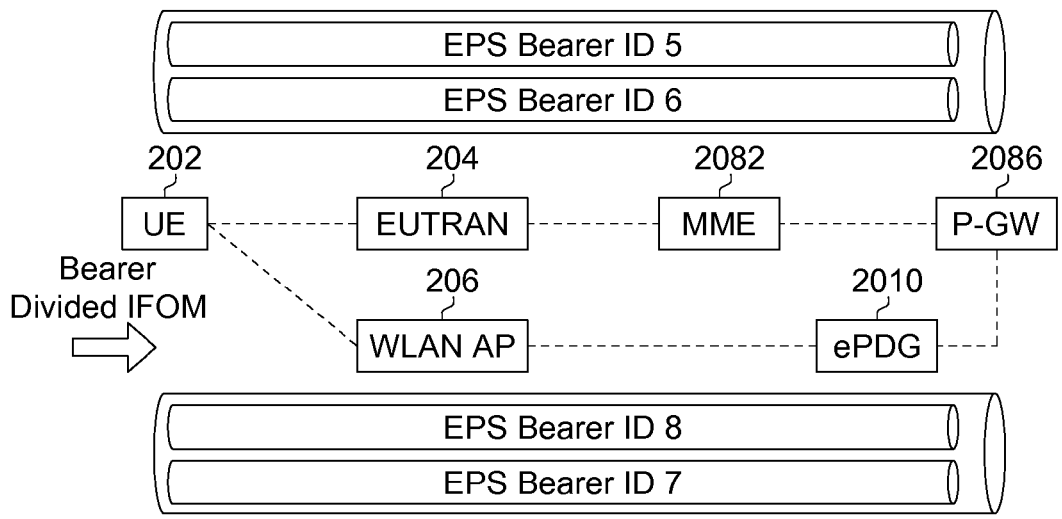
FIG. 9(b) shows a schematic diagram of the communication system from the perspective of user plane after an IFOM procedure is performed.

FIG. 9(*a*) shows a schematic diagram of the communication system from the perspective of user plane according to an embodiment of the present disclosure. In the example of FIG. 9(a), the UE 202 initially has EPS bearer ID 5 and 6 for the EUTRAN 204 (3GPP network), and has EPS bearer ID 7 for the WLAN 206 (non-3GPP network). Each EPS bearer ID may correspond to one or more IP flows. After the P-GW 2086 makes a bearer division in response to an IFOM triggering message sent by an eNB of the EUTRAN 204, a new EPS bearer ID 8 for the WLAN 206 is created in response to the bearer division made by the P-GW 2086, and a part of the IP flows of the UE 202 originally belonged to the EPS bearer ID 6 are offloaded to the WLAN 206 and belong to the new EPS bearer ID 8, as shown in FIG. 9(b). In another example, without creating a new EPS bearer ID 8, the IP flows of the UE 202 originally belonged to the EPS bearer ID 6 are offloaded to the EPS bearer ID 7 of the WLAN 206.

FIG. 10(a) shows a mapping table 1002 stored at the P-GW 2086 before updated by the eNB-initiated IFOM procedure shown in FIG. 9(b). The mapping table 1002 includes an Temporary mobile subscriber identity (TMSI) field, a Routing Rule Name field, a Routing Access Type field, a Binding Identification (BID) field, an EPS bearer ID field, a Flow ID (FID) field and a Routing Filter field. Taking the UE 202 as an example, it has TMSI ID of UE1, EPS bearer ID 5 and 6 for the 3GPP network and EPS bearer ID 7 for the WLAN (non-3GPP network). Moreover, in this example, the IP flow 6-2 with FID 2 is restricted in the 3GPP network indicated by ANDSF. That is, the IP flow 6-2 with FID2 is not allowed to be offloaded to the non-3GPP network during the IFOM procedure.

FIG. 10(b) shows a mapping table 1004 stored at the UE 202 before updated by the eNB-initiated IFOM procedure shown in FIG. 9(b). The mapping table 1004 includes a Routing rule name field, a Routing Access Type field, a BID field, an EPS bearer ID field and a Routing Filter Field. As can be seen from the mapping table 1004, the UE 202 has EPS bearer ID 5 and 6 for the 3GPP network and EPS bearer ID 7 for the WLAN, and the IP flow 6-2 with FID 2 is restricted in the 3GPP network indicated by ANDSF.

FIG. 10(c) shows a mapping table 1006 stored at the eNB 2042 before updated by the eNB-initiated IFOM procedure shown in FIG. 9(b). Since the eNB 2042 only knows the information of bearers (RAN-level information), the mapping table 1006 mainly records the one-to-one mapping between the EPS bearer and the RAB bearer.

FIG. 11(a) shows a mapping table 1102 stored at the P-GW 2086 after updated by the eNB-initiated IFOM procedure shown in FIG. 9(b). Because the IP flow 6-2 with FID 2 is restricted in the 3GPP network, the P-GW 2086 executes a bearer division and asks the ePDG 2010 to respond an EPS bearer ID to its request. In this example, the ePDG 2010 responds a new EPS bearer ID 8 to the P-GW 2086 and the IP flow with FID3 and the IP flow with FID4 that originally belong to EPS bearer ID 6 and are not restricted in the EUTRAN 204 can be offloaded to the WLAN 206 and belong to the new EPS bearer ID 8. In another example, without creating a new EPS bearer ID 8, the IP flow with FID3 and the IP flow with FID4 originally belonged to the EPS bearer ID 6 can be offloaded to the EPS bearer ID 7 of the WLAN 206. Specifically, if the QoS class of identifier (001) of the offloaded bearer is able to be supported by an existing bearer in the WLAN 206 such as the EPS bearer ID 7, the P-GW 2086 would send an Update Bearer Request to the ePDG 2010 after the bearer-division execution, and UE 202's two IP flows with FID3 and FID4 originally belonged to the EPS bearer ID 6 can be offloaded to the WLAN 206 and belong to the existing EPS bearer ID 7.

FIG. 11(b) shows a mapping table 1104 stored at the UE 202 after updated by the eNB-initiated IFOM procedure shown in FIG. 9(b). The UE 202 updates its traffic steering table 1104 after receiving the notification from the ePDG 2010. As shown in FIG. 11(b), the ePDG 2010 informs the UE 202 that a new EPS bearer ID 8 is created, and the IP flows originally belong to EPS bearer ID 6 and are not restricted in the EUTRAN 204 are offloaded to the WLAN 206 and belong to the new EPS bearer ID 8. In another example, without creating a new EPS bearer ID 8, the IP flows originally belonged to the EPS bearer ID 6 can be offloaded to the EPS bearer ID 7 of the WLAN 206.

FIG. 11(c) shows a mapping table 1106 stored at the eNB 2042 after updated by the eNB-initiated IFOM procedure shown in FIG. 9(b). In the example of FIG. 11(c), after the P-GW 2086 receives a positive response from the ePDG 2010, the P-GW 2086 would trigger a dedicated bearer modification procedure for the EPS bearer ID 6 and send a dedicated bearer activation information of for the EPS bearer ID 8. Thus, when the eNB 2042 receives this notification, it setups the entries of the mapping table 1106. It is to be noted that the bearer information of the new EPS bearer ID 8 may be delivered from either the P-GW 2086 or UE 202 to the eNB 2042. This means that the P-GW 2086 may send the dedicated bearer activation information of the EPS bearer ID 8 to the eNB 2042, or the UE 202 may send the bearer information of the EPS bearer ID 8 via the traffic steering procedure to the eNB 2042.

In another embodiment of the present disclosure, the IFOM procedure is triggered by the UE rather the eNB. That is, the bearer division principle at the P-GW is also able to be realized for UE-initiated IFOM. Detailed operation of the UE-initiated IFOM procedure is described as follows.

Figure 12A:
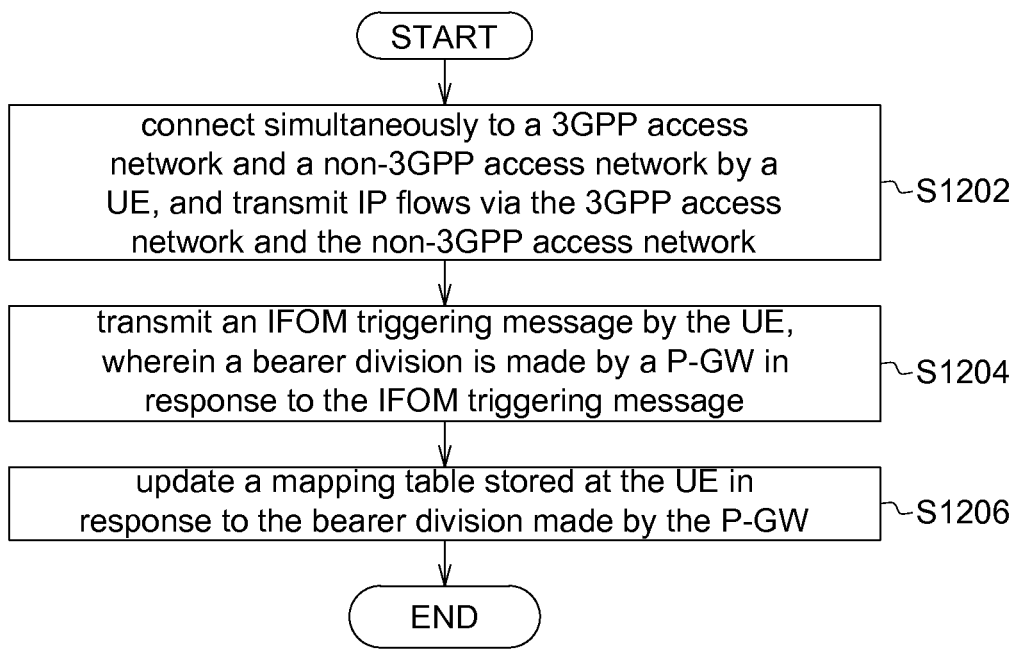
FIG. 12(a) shows a flow chart of a communication method according to an embodiment of the disclosure.

FIG. 12(a) shows a flow chart of a communication method according to an embodiment of the disclosure. At step S1202, the UE connects simultaneously to a 3GPP access network and a non-3GPP access network, and transmits IP flows via the 3GPP access network and the non-3GPP access network. At step S1204, the UE transmits an IFOM triggering message, wherein making a bearer division by a P-GW in response to the IFOM triggering message. At step S1206, a mapping table stored at the UE is updated in response to the bearer division made by the P-GW.

Figure 12B:
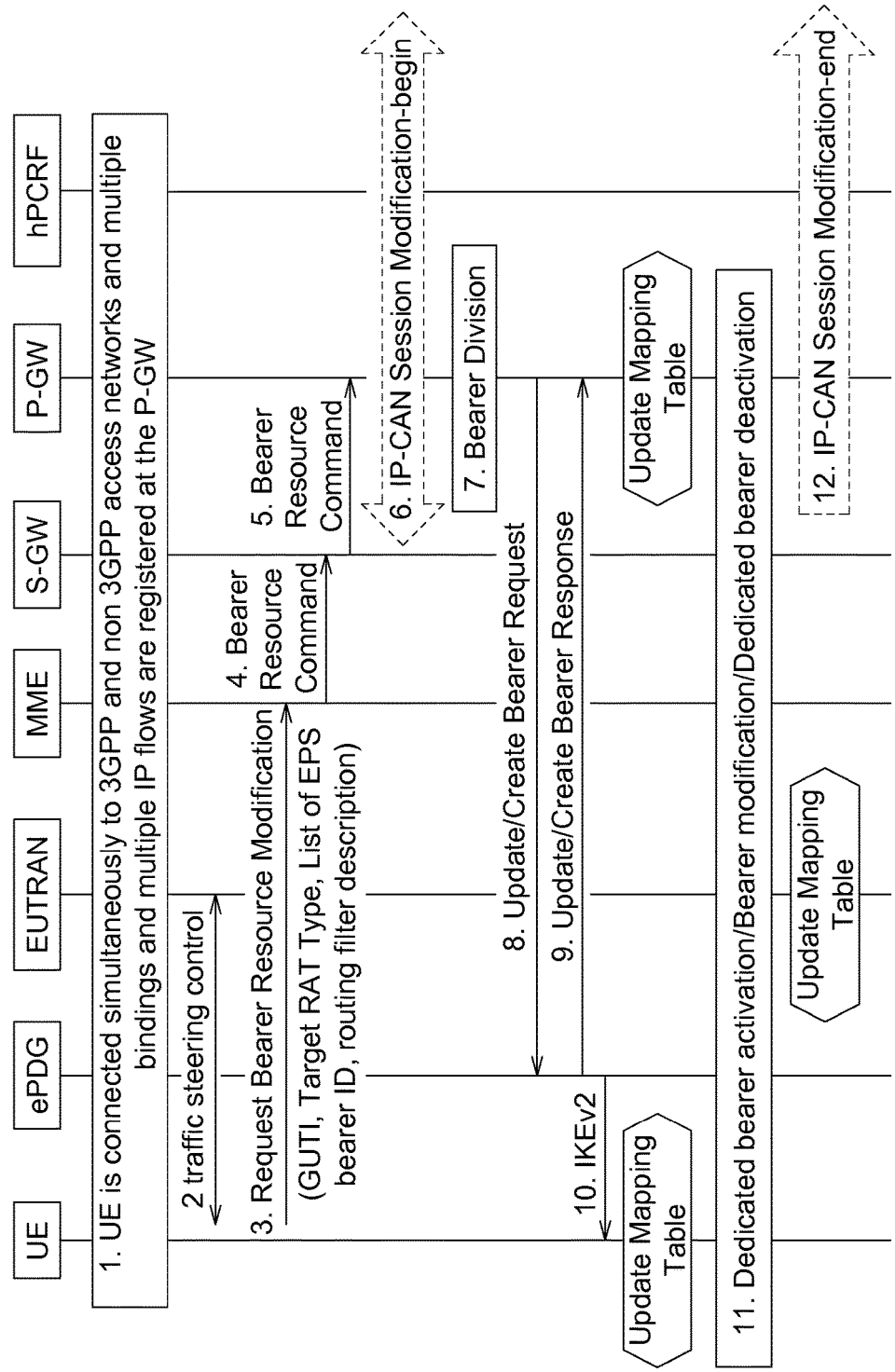
FIG. 12(b) shows a high-level message flow of an UE-initiated IFOM procedure triggered from a UE according to an embodiment of the present disclosure.

FIG. 12(b) shows a high-level message flow of an UE-initiated IFOM procedure triggered from a UE according to an embodiment of the present disclosure. In the example of FIG. 12, the IFOM triggering message is sent from the UE. At step 1, the UE is connected simultaneously to the 3GPP access network and the non-3GPP access network, and multiple bindings and multiple IP flows are registered at the P-GW. At step 2, a bi-directional procedure for traffic steering control is performed between the UE and the eNB (EUTRAN). At step 3, the UE sends a Request Bearer Resource Modification message (i.e., an IFOM triggering message) to the MME. The Request Bearer Resource Modification message comprises UE ID (e.g., Globally Unique Temporary Identity (GUTI)), Target RAT Type, List of EPS bearer ID, and routing filter description which is optional, where List of EPS bearer indicates the EPS bearer ID required to be offloaded to another access network. In the example of FIG. 12, the UE sends the IFOM triggering message to the MME of a core network including the P-GW. The IFOM triggering message is then passed to the P-GW. At steps 4 to 7, after the Bearer Resource Command is passed to the P-GW and the IP-CAN session modification procedure, the P-GW would make a bearer division if the ANDSF/hPCRF have forbidden or restrict some traffic indicated to offload by the RAN. After steps 8 and 9, the P-GW updates its mapping table. At step 10, the UE receives an informational request including the bearer division of the P-GW from the ePDG and updates its mapping table. During step 11, a 3GPP dedicated bearer activation, modification, or deactivation is triggered by the P-GW, and the eNB would update its traffic steering mapping table.

Figure 13:
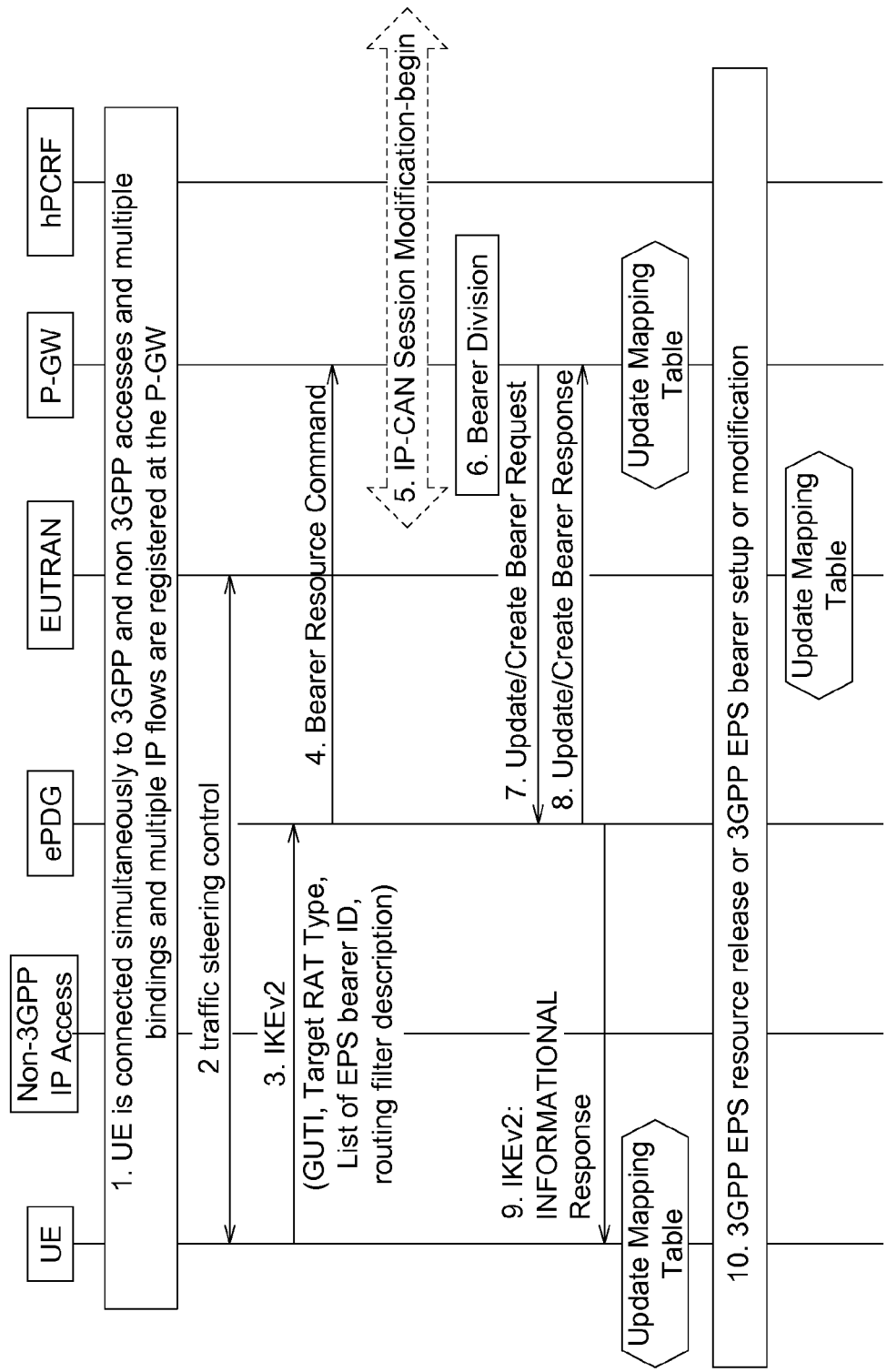
FIG. 13 shows a high-level message flow of an UE-initiated IFOM procedure triggered from a UE according to another embodiment of the present disclosure.

FIG. 13 shows a high-level message flow of an UE-initiated IFOM procedure triggered from a UE according to another embodiment of the present disclosure. As shown in FIG. 13, at step 1, the UE is connected simultaneously to the 3GPP access network and the non-3GPP access network, and multiple bindings and multiple IP flows are registered at the P-GW. At step 2, a bi-directional procedure for traffic steering control is performed between the UE and the eNB. In the example of FIG. 13, the UE transmits the IFOM triggering message to an ePDG of a core network including the P-GW, and the ePDG sends the IFOM triggering message to the P-GW. As shown in step 3, the UE sends an INFORMATIONAL Request of Internet Key Exchange Protocol Version 2 (IKEv2) to the ePDG (EUTRAN). The INFORMATIONAL Request (i.e., an IFOM triggering message) in the binding update may comprise the GUTI, Target RAT Type, List of EPS bearer ID, and routing filter description which is optional, where List of EPS bearer indicates the EPS bearer ID required to be offloaded to another access network. At steps 4 to 7, after ePDG sends a Bearer Resource Command to the P-GW and the IP-CAN session modification procedure, the P-GW would make a bearer division if ANDSF/hPCRF have forbidden or restrict some traffic indicated to offload by the RAN. After step 7 and 8, the P-GW updates its mapping table and after step 9, the UE updates its mapping table. During step 10, a 3GPP dedicated bearer activation, modification, or deactivation is triggered by the P-GW, and the eNB in the EUTRAN would update its mapping table.

In the aspects disclosed herein, the P-GW of the communication system of the present disclosure receives the IFOM triggering message either from the eNB or from the UE. After receiving the IFOM triggering message, the P-GW may makes a bearer division if ANDSF/hPCRF has forbidden or restrict some traffic indicated to offload by RAN. The P-GW, the UE and the eNB may update their mapping tables. Because the RAN is able to control the network selection and traffic steering, the performance of the IFOM procedure of the present disclosure can be enhanced by RAN level.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A communication method of IP flow mobility (IFOM), comprising:
   receiving an IFOM triggering message by a packet data network gateway (P-GW);
   selecting one or more evolved packet system (EPS) bearers by the P-GW based on the IFOM triggering message, and making a bearer division if IP flows associated with a user equipment (UE) are not allowed to a first access network;
   sending a first request to the first access network in response to the bearer division;
   updating a mapping table if the first request is acknowledged by the first access network; and
   initiating a third generation partnership project (3GPP) bearer update procedure to move the one or more EPS bearers selected by the P-GW to the first access network;
   wherein the IFOM triggering message is sent from an evolved NodeB (eNB), and
   wherein the IFOM triggering message comprises:
   message type, indicating the type of the IFOM triggering message;
   a mobility management entity (MME) UE S1 application protocol (S1AP) identification (ID), indicating a UE association over a S1 interface within a MME of a core network including the P-GW;
   an eNB UE S1AP ID, indicating a UE association over the S1 interface within the eNB;
   a target radio access technology (RAT) type, indicating the type of an access network to which the UE wants to move IP flows; and
   an evolved universal terrestrial radio access network radio access bearer (E-RAB) steered list, indicating E-RABs for the UE.

2. The communication method according to claim 1, further comprising:
   triggering a 3GPP dedicated bearer activation, modification, or deactivation by the P-GW; and
   updating a traffic steering mapping table by the eNB in response to the 3GPP dedicated bearer activation, modification, or deactivation.

3. A communication method of IP flow mobility (IFOM), comprising:
   receiving an IFOM triggering message by a packet data network gateway (P-GW);
   selecting one or more evolved packet system (EPS) bearers by the P-GW based on the IFOM triggering message, and making a bearer division if IP flows associated with a user equipment (UE) are not allowed to a first access network;
   sending a first request to the first access network in response to the bearer division;
   updating a mapping table if the first request is acknowledged by the first access network; and
   initiating a third generation partnership project (3GPP) bearer update procedure to move the one or more EPS bearers selected by the P-GW to the first access network,
   wherein the IFOM triggering message is sent from an evolved NodeB (eNB), and
   wherein the IFOM triggering message is formed by adding information elements (IEs) into an E-RAB release indication message, and the IEs comprises:
   a steering flag, indicating the E-RAB release indication message is for an IFOM procedure rather than a release procedure;
   a target RAT type, indicating the type of an access network to which the UE wants to move IP flows; and
   an E-RAB released list, indicating E-RABs to be steered for the UE.

4. A communication method of IP flow mobility (IFOM), comprising:
   receiving an IFOM triggering message by a packet data network gateway (P-GW);
   selecting one or more evolved packet system (EPS) bearers by the P-GW based on the IFOM triggering message, and making a bearer division if IP flows associated with a user equipment CUE) are not allowed to a first access network;

sending a first request to the first access network in response to the bearer division;
updating a mapping table if the first request is acknowledged by the first access network; and
initiating a third generation partnership project (3GPP) bearer update procedure to move the one or more EPS bearers selected by the P-GW to the first access network,
wherein the IFOM triggering message is sent from an evolved NodeB (eNB), and
wherein forming the IFOM triggering message by adding IEs into a path switch request message, and the IEs comprises:
a steering flag, indicating the path switch request message is for an IFOM procedure rather than a switching downlink traffic procedure;
a target RAT type, indicating the type of an access network to which the UE wants to move IP flows; and
an E-RAB to be switched in downlink list, indicating E-RABs to be steered for the UE.

5. The communication method according to claim 1, wherein the IFOM triggering message comprises a UE ID, a target RAT type and a list of EPS bearer ID.

6. The communication method according to claim 1, further comprising:
creating a first EPS bearer ID for the first access network in response to the bearer division made by the P-GW; and
offloading a part of IP flows originally belonged to a second EPS bearer ID to the first EPS bearer ID.

7. The communication method according to claim 1, wherein the first access network has a first EPS bearer ID before the P-GW makes the bearer division, and the communication method further comprises:
without creating a new EPS bearer ID for the first access network, offloading a part of IP flows originally belonged to a second EPS bearer ID to the first EPS bearer ID.

8. The communication method according to claim 1, wherein the first access network is non-3GPP network.

9. A communication method of IFOM, comprising:
receiving a traffic steering response from a UE by an eNB;
transmitting an IFOM triggering message by the eNB, wherein triggering a 3GPP dedicated bearer activation, modification, or deactivation by a P-GW in response to the IFOM triggering message; and
updating a traffic steering mapping table of the eNB in response to the 3GPP dedicated bearer activation, modification, or deactivation triggered by the P-GW,
wherein the IFOM triggering message comprises:
message type, indicating the type of the IFOM triggering message;
a MME UE S1AP ID, indicating a UE association over a S1 interface within a MME of a core network including the P-GW;
an eNB UE S1AP ID, indicating a UE association over the S1 interface within the eNB;
a target RAT type, indicating the type of an access network to which the UE wants to move IP flows; and
an E-RAB steered list, indicating E-RABs for the UE.

10. A communication method of IFOM, comprising:
receiving a traffic steering response from a UE by an eNB;
transmitting an IFOM triggering message by the eNB, wherein triggering a 3GPP dedicated bearer activation, modification, or deactivation by a P-GW in response to the IFOM triggering message; and
updating a traffic steering mapping table of the eNB in response to the 3GPP dedicated bearer activation, modification, or deactivation triggered by the P-GW,
wherein forming the IFOM triggering message by adding information elements (IEs) into an E-RAB release indication message, and the IEs comprises:
a steering flag, indicating the E-RAB release indication message is for an IFOM procedure rather than a release procedure;
a target RAT type, indicating the type of an access network to which the UE wants to move IP flows; and
an E-RAB released list, indicating E-RABs to be steered for the UE.

11. A communication method of IFOM, comprising:
receiving a traffic steering response from a UE by an eNB;
transmitting an IFOM triggering message by the eNB, wherein triggering a 3GPP dedicated bearer activation, modification, or deactivation by a P-GW in response to the IFOM triggering message; and
updating a traffic steering mapping table of the eNB in response to the 3GPP dedicated bearer activation, modification, or deactivation triggered by the P-GW,
wherein forming the IFOM triggering message by adding IEs into a path switch request message, and the IEs comprises:
a steering flag, indicating the path switch request message is for an IFOM procedure rather than a switching downlink traffic procedure;
a target RAT type, indicating the type of an access network to which the UE wants to move IP flows; and
an E-RAB to be switched in downlink list, indicating E-RABs to be steered for the UE.

* * * * *